July 29, 1924.
A. E. SCHEIN
1,503,431
MEANS FOR BALANCING ROTORS
Filed Jan. 26, 1921
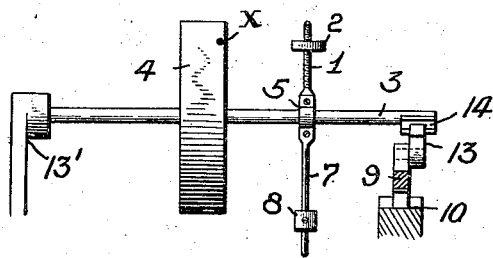
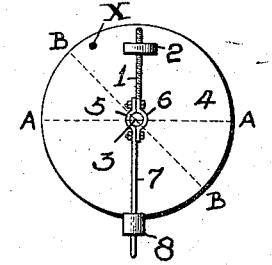
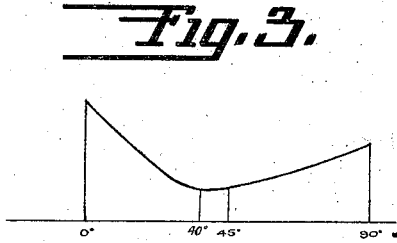
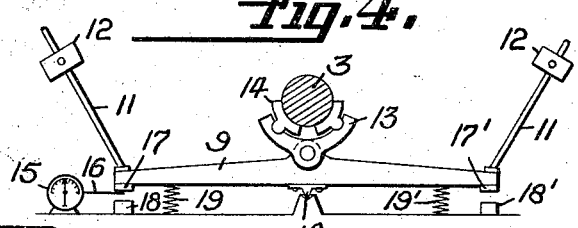
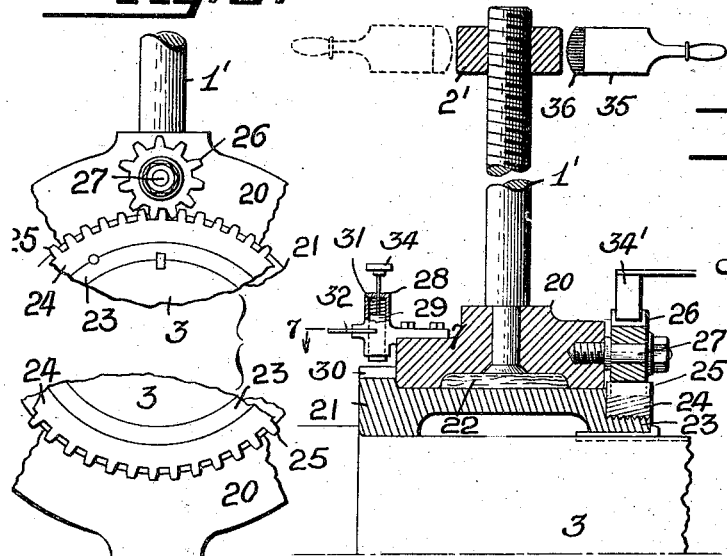
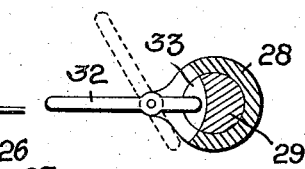
Inventor
ALEXANDER E SCHEIN
By his Attorney
Herbert H. Thompson Patented July 29, 1924.

1,503,431

UNITED STATES PATENT OFFICE.

ALEXANDER E. SCHEIN, OF BROOKLYN, NEW YORK, ASSIGNOR TO THE SPERRY GYROSCOPE COMPANY, OF BROOKLYN, NEW YORK, A CORPORATION OF NEW YORK.

MEANS FOR BALANCING ROTORS.

Application filed January 26, 1921. Serial No. 440,054.

*To all whom it may concern:*

Be it known that I, ALEXANDER E. SCHEIN, a citizen of the United States of America, residing at 476 Clinton Avenue, Brooklyn, in the county of Kings and State of New York, have invented certain new and useful Improvements in Means for Balancing Rotors, of which the following is a specification.

This invention relates to the balancing of heavy rotating bodies such as the rotors of gyroscopes for ship stabilizers, heavy flywheels, etc. Heretofore it has been essential to spin up the rotor to a high velocity and permit it to come to rest a considerable number of times during the balancing operation. Since a gyroscope rotor possesses a relatively large moment of inertia the time thus consumed was large, it requiring about an hour to bring a large rotor up to the balancing speed and at least the same time to bring it to rest, as such rotors are not equipped with brakes as the wheel is enenclosed. The balancing of a single rotor now requires on an average four days or more.

The chief object of my invention is the provision of means whereby the rotor may be accurately balanced without the necessity of stopping its rotation so that the time required in balancing need not exceed four or five hours.

Further objects and advantages of my invention will become apparent as the description thereof is hereinafter developed.

Referred to the drawings wherein I have shown what I now consider to be the preferred form of my invention:

Fig. 1 is a view in side elevation showing part of the apparatus heretofore commonly in use for balancing rotors.

Fig. 2 is a front elevation of the apparatus shown in Fig. 1.

Fig. 3 is a view of a curve plotted in connection with the balancing of the rotor.

Fig. 4 is a front elevation of further apparatus commonly used in the balancing of rotors, the rotor shaft being in section.

Fig. 5 is a sectional view, partly in elevation, of the top half of my improved apparatus.

Fig. 6 is a front elevation of the apparatus shown in Fig. 5.

Fig. 7 is a sectional view on line 7—7 of Fig. 5.

In order that my invention may be clearly understood I have shown in Figs. 1, 2, and 3 apparatus commonly employed in the balancing of rotors. As shown, a threaded arm 1 provided with a weight 2 in threaded engagement therewith is adjustably secured to the shaft 3 of the rotor 4 as by means of cooperating clamps 5, 6. The arm 1 is shown extending from clamp 6, while from clamp 5 may project an arm 7 provided with a suitable counter weight 8. In testing the balance of the rotor the latter is rotated at a given velocity and the amplitude of the vibrations of the rotor and shaft are measured for different positions of arms 1 and 7 about the axis of shaft 3 and for different positions of weight 2 on arm 1.

A common form of apparatus for measuring the amplitude of the vibrations aforesaid is shown in Fig. 4. An arm 9 is pivotally supported and balanced intermediate its ends by means of a suitable knife edge support 10. Rods 11 provided with weights 12 extend upwardly from opposite ends of arm 9 and aid in accurately balancing the latter about its knife edge support. Arm 9 serves to support shaft 3 in any suitable manner, as through a curved bearing block 13 pivoted to said arm above the knife edge 10 and carrying on its inner face two auxiliary pivoted bearing blocks 14 which receive said shaft 3. As the latter and rotor 4 are rotated the amplitude of the vibrations or oscillations imparted therefrom to arm 9 are measured by a suitable indicator 15 having an arm 16 projecting into the path of a projection 17 on one end of said arm 9. The indicator 15 is of a type which accurately measures extremely small amplitudes of vibration, amplitudes as small as .001 inch, for example; and since this indicator is well known in the art description thereof is unnecessary. Suitable stops 18, 18' may be provided under projections 17, 17' on opposite ends of arm 9 so that the amplitude of the vibrations imparted to said arm may be limited. Springs 19, 19' may be employed on opposite sides of knife edge 10, as shown, for offering resistance to vibrations or oscillations of arm 9 and for normally biasing said arm to horizontal position.

The method customarily employed in balancing rotors with the apparatus above described is as follows: The arms 1 and 7 are clamped on shaft 3 in a given position with respect to rotor 4, the position shown in Fig. 2, for instance. Rotor 4 and shaft 3 are then rotated, their velocity of rotation being changed from time to time and the amplitude of the vibrations imparted to arm 9 being measured for each velocity in order to determine that velocity of rotation for which said amplitude is a maximum. The said velocity being determined, ordinarily from 100 to 150 R. P. M., and the amplitude of vibration of arm 9 at that velocity being measured for the given position of arms 1 and 7, the rotor is allowed to come to rest and said arms 1 and 7 are turned with respect to shaft 3 and rotor 4 through a given angle, say, for example, into dotted line position A—A in Fig. 2. Said arms are clamped in the last mentioned position and rotor 4 is again spun up until it has again attained the velocity above mentioned, and the amplitude of vibration imparted to arm 9 is measured for the new position of arms 1 and 7. Again the rotor is allowed to come to rest and arms 1 and 7 shifted with respect to shaft 3 and said rotor to a new angular position, position B—B in Fig. 2, for example, whereupon the rotor is again spun up to the aforesaid velocity and the amplitude of vibration again measured. This procedure is continued until the angular position of arms 1 and 7 with respect to shaft 3 and rotor 4 which corresponds to the least amplitude of vibration has been determined. Usually said position is found by plotting a curve such as shown in Fig. 3, with the amplitudes of vibration as ordinates and different angular positions of arms 1 and 7 with respect to shaft 3 and rotor 4 as abscissæ. In the example shown in Fig. 3, 0° corresponds to the full line position of arms 1 and 7 in Fig. 2, while 45° corresponds to position B—B, and 90° to position A—A. Of course the amplitudes of vibration are measured for a sufficient number of positions of arms 1 and 7 with respect to rotor 4 to enable an accurate curve to be plotted. In Fig. 3 the minimum amplitude of the vibrations imparted to arm 9 corresponds to a position of arms 1 and 7, with respect to shaft 3 and rotor 4, 40° in a counter-clockwise direction from their full line position in Fig. 2. This position of arms 1 and 7 defines the plane within which is located the point on the adjacent side of rotor 4 to which weight must be added or subtracted to balance said rotor.

The next step in the balancing of the rotor is to clamp arms 1 and 7 in the position corresponding to the minimum amplitude of vibration, for a given position of weight 2 on arm 1, as above determined, and to measure the amplitude of vibration for different positions of weight 2 on arm 1. The rotor is rotated at the same velocity as before, with weight 2 in a definite position on arm 1, and the amplitude of vibration imparted to arm 9 is measured in the usual manner. The rotor is then allowed to come to rest, weight 2 adjusted to a different position on arm 1, the rotor spun up again to its predetermined velocity, and the amplitude of vibration again measured. This procedure is repeated for different positions of weight 2 on arm 1 until finally a position is found wherein the amplitude of vibration is either zero or an extremely small minimum. By finding the position of weight 2 on arm 1 which corresponds to the minimum amplitude of vibration the point X on the adjacent side of rotor 4 to which weight must be added or subtracted is located. The correct direction in which weight 2 must be moved on arm 1 is found by first moving it a given amount in either direction from its original position. If the amplitude of vibration is now greater the said weight has been adjusted in the wrong direction and should be moved from its original position in the opposite direction. The direction in which weight 2 must be moved on arm 1 to obtain the minimum amplitude of vibration also determines whether weight should be added to or subtracted from point X. In the original position of weight 2, said weight is balanced by counter weight 8 so that moving weight 2 away from said counter weight indicates that weight must be added to point X, whereas movement of weight 2 in the opposite direction shows that weight must be subtracted from said point.

After the position of point X is ascertained as above described, arms 1 and 7 are transferred to the other side of rotor 4 and the process above described is repeated until a point on said other side of the rotor corresponding to the minimum amplitude of vibration is located. The proper amount of weight is then added to or subtracted from point X and the aforesaid point on the other side of the rotor, whereupon said rotor is accurately balanced. As shown, shaft 3 may be mounted at one end on bearing 13 and arm 9 and at its other end may be supported on any suitable or conventional bearing 13'. The bearing 13 and arm 9 are positioned on the same side of the rotor as arms 1 and 7, and when said arms are transferred from one side of the rotor to the other, arm 9 and bearing 13' are interchanged accordingly.

It will be seen that the balancing process above described consumes a great amount of time owing to the necessity of repeatedly spinning up the rotor to a given velocity and allowing it to come to rest. By the means which I have devised, the balancing may be effected without the necessity of stopping rotation of the rotor. The means which I prefer at present for accomplishing this result is shown in Figs. 5, 6, and 7 and may be constructed substantially as follows:

The arms 1' and 7' are carried at diametrically opposite portions of a sleeve 20, which sleeve is rotatably mounted upon a second sleeve 21 keyed to rotate with shaft 3. If desired, the sleeve 20 may be provided with an internal annular chamber 22 within which lubricating material may be placed. Threaded on or otherwise suitably fixed to a seat portion 23 of sleeve 21 is an annular member 24 provided around its outer circumference with gear teeth 25. Meshing with said teeth is a pinion 26 mounted for rotation upon a stud shaft 27 secured to sleeve 20. To the opposite side of sleeve 20 is secured a casing 28 within which is housed a slidable plunger 29 having its lower end portion adapted to project beyond the bottom of said housing and formed to engage between suitable ratchet teeth 30 which extend around the circumference of sleeve 21. A spring 31, interposed between housing 28 and plunger 29, biases the latter towards its position of engagement with ratchet teeth 30, but the plunger is normally prevented from assuming this position by means of a latch 32. The latter is pivoted intermediate its ends to housing 28 and one end of said latch is adapted to project into a slot 33 in plunger 29. Latch 32 may be turned so that it is moved out of engagement with plunger 29, as shown in dotted lines in Fig. 7, whereupon spring 31 will force said plunger into engagement with the ratchet teeth 30 and sleeve 20 will thereby be locked to sleeve 21. Plunger 29 may be provided with a stem projecting upwardly through the end of casing 28 and on the end of said stem may be secured a handle 34 for withdrawing said plunger into its inoperative position when desired.

The operation of my improved rotor balancing apparatus is as follows: Plunger 29 being locked by latch 32 in its inoperative position, the sleeve 20 may be rotated to any desired position on sleeve 21. Shaft 3 is then rotated and the velocity giving the maximum amplitude of vibration determined as before. Rotation of shaft 3 causes both sleeves 20 and 21 to rotate together, due to the intermeshing of pinion 26 and gear teeth 25, even though plunger 29 is not in engagement with ratchet teeth 30. When it is desired to shift the position of sleeve 20 on sleeve 21, so as to vary the angular position of arms 1' and 7' with respect to shaft 3 and the rotor, a spring stop member 34' is moved, by hand or in any other suitable manner, into the path of pinion 26. When the pinion strikes said spring stop in turning with shaft 3 rotation of said pinion upon stud shaft 27 results and sleeve 20 is thereupon moved with respect to sleeve 21. Rotation of sleeve 20 a given amount on sleeve 21 will thus occur once during each revolution of shaft 3 so long as spring stop 34' is in the path of pinion 26. By this means the position of arms 1' and 7' may be varied as desired without the necessity of stopping the rotation of shaft 3, and the amplitudes of vibration may be meausred as in Fig. 4. After the plane of the point on the adjacent side of the rotor to which weight must be added or subtracted has been found and sleeve 20 has been moved so that arms 1' and 7' lie in that plane, latch 32 is moved into the dotted line position in Fig. 7, and plunger 29 thereupon locks sleeve 20 to sleeve 21. The position of weight 2' on arm 1' is then varied. This may be accomplished without stopping rotation of shaft 3 by moving into engagement with said weight 2' a suitable member 35 which may be provided on one face with rubber 36 or other suitable material. It will readily be seen that as weight 2' turns with shaft 3 said weight may be adjusted in one direction or the other on arm 1' by merely moving member 35 into engagement with one side or the other of said weight so that rotation of said weight about the axis of arm 1', and hence longitudinal adjustment of said weight on said arm, will occur each time that member 35 is engaged with said weight. When moved from the full line position shown in Fig. 5 into engagement with weight 2', member 35 will cause movement of said weight on arm 1' in one direction, and when moved from the dotted line position into engagement with said weight said member 35 will cause movement of said weight in the opposite direction. In this manner the position of weight 2' on arm 1' may be varied and the corresponding amplitudes of vibration measured without stopping rotation of shaft 3. Sleeve 21 and associated parts may, of course, be quickly moved from one side to the other of rotor 4 so that the points on each side of said rotor to which weight must be added or subtracted may be quickly determined. The balancing of the rotor may be accomplished by my above described apparatus without consuming time in repeatedly bringing the rotor and shaft to the desired speed and allowing them to come to rest.

While I have described my invention in connection with the balancing of "rotors" it will be obvious that my invention is capable of use in the balancing of rotating bodies in general and consequently I wish to have it understood that by the term "rotor," as used herein and in the appended claims, I mean any body subject to rotation, whether a flywheel, the rotor of a gyroscope, turbine, or other rotary element.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with a rotor shaft, a sleeve surrounding said shaft, an annular gear secured to said sleeve, a second sleeve surrounding the first mentioned sleeve and rotatable with respect thereto, a pinion rotatable with respect to said second sleeve and supported thereby, said pinion meshing with said annular gear, and oppositely extending arms secured to said second sleeve.

2. In combination with a rotor shaft, a sleeve surrounding said shaft, an annular gear secured to said sleeve, a second sleeve surrounding the first mentioned sleeve and rotatable with respect thereto, a pinion supported by said second sleeve and meshing with said annular gear, oppositely extending arms secured to said second sleeve, and a weight adjustably supported by at least one of said arms.

3. In the combination specified in claim 1, means for causing rotation of said pinion with respect to said annular gear.

4. In the combination specified in claim 2, means for adjusting said weight with respect to said arm.

5. In combination with a rotor shaft, a sleeve surrounding said shaft, an annular gear secured to said sleeve, a second sleeve surrounding the first mentioned sleeve and rotatable with respect thereto, a pinion supported by said second sleeve and meshing with said annular gear, means for locking said second sleeve to said first mentioned sleeve, and oppositely extending arms secured to said second sleeve.

In testimony whereof I have affixed my signature.

ALEXANDER E. SCHEIN.